(12) United States Patent
Moeglein et al.

(10) Patent No.: US 8,688,138 B2
(45) Date of Patent: Apr. 1, 2014

(54) METHOD AND APPARATUS FOR LOCATION DETERMINATION IN A WIRELESS ASSISTED HYBRID POSITIONING SYSTEM

(75) Inventors: Mark Leo Moeglein, Ashland, OR (US);
Wyatt Thomas Riley, Wayne, PA (US)

(73) Assignee: QUALCOMM Incorporated, San Diego, CA (US)

( * ) Notice: Subject to any disclaimer, the term of this patent is extended or adjusted under 35 U.S.C. 154(b) by 871 days.

(21) Appl. No.: 12/270,570

(22) Filed: Nov. 13, 2008

(65) Prior Publication Data

US 2009/0131076 A1      May 21, 2009

Related U.S. Application Data

(63) Continuation of application No. 10/423,251, filed on Apr. 24, 2003, now Pat. No. 7,460,870.

(60) Provisional application No. 60/375,965, filed on Apr. 25, 2002.

(51) Int. Cl.
*H04W 24/00* (2009.01)
*H04B 7/00* (2006.01)
*H04B 7/212* (2006.01)
*G01S 1/24* (2006.01)
*G08B 21/00* (2006.01)

(52) U.S. Cl.
USPC .................... 455/456.1; 455/456.2; 455/513; 370/347; 342/463; 342/387; 340/686.1

(58) Field of Classification Search
USPC ........................................ 455/456.1
See application file for complete search history.

(56) References Cited

U.S. PATENT DOCUMENTS

| 5,430,657 | A |   | 7/1995 | Kyrtsos |
| 5,490,073 | A |   | 2/1996 | Kyrtsos |
| 5,552,794 | A | * | 9/1996 | Colley et al. ............. 342/357.25 |
| 5,724,660 | A |   | 3/1998 | Kauser et al. |

(Continued)

OTHER PUBLICATIONS

Database WPI, Derwent Publications Ltd., London, GB; AN 2001255203, & KR20000060020, Samsung Electronics Co. Ltd., Oct. 16, 2000, abstract & US6,459,903 B1, Lee Myung-Su, Oct. 1, 2002, XP002255203.

(Continued)

*Primary Examiner* — Timothy Pham
(74) *Attorney, Agent, or Firm* — Thien T. Nyguyen

(57) ABSTRACT

Methods and apparatuses for location determination in wireless assisted positioning systems. In one aspect of the disclosed method and apparatus, a method to determine a position of a mobile device in a positioning system includes: computing a second estimated position of a mobile device using a first assumed geometric relationship for a location of the mobile device in relation to a navigational transmitter (e.g., a basestation, a pseudolite, or a Satellite Positioning System (SPS) satellite). The first geometric relationship is linearly independent from the altitude of the mobile device (e.g., obtained from an altitude aiding) and a second geometric relationship based on range information (e.g., a range from the mobile device to the navigational transmitter, a pseudorange, an arrival time, or a round trip time) measured with respect to the navigational transmitter. In another embodiment of the disclosed method and apparatus, the method to determine a position of a mobile device in a positioning system includes: determining an estimated clock bias from a strength indicator of a signal transmitted from a navigational transmitter to the mobile device.

26 Claims, 14 Drawing Sheets

(56) References Cited

U.S. PATENT DOCUMENTS

| | | | |
|---|---|---|---|
| 5,732,354 A | 3/1998 | MacDonald | |
| 5,740,048 A * | 4/1998 | Abel et al. | 701/470 |
| 5,812,087 A | 9/1998 | Krasner | |
| 5,841,396 A | 11/1998 | Krasner | |
| 5,874,914 A | 2/1999 | Krasner | |
| 5,931,889 A * | 8/1999 | Misra | 701/476 |
| 5,945,944 A | 8/1999 | Krasner | |
| 6,061,018 A | 5/2000 | Sheynblat | |
| 6,081,229 A | 6/2000 | Soliman et al. | |
| 6,215,442 B1 | 4/2001 | Sheynblat et al. | |
| 6,243,648 B1 * | 6/2001 | Kilfeather et al. | 701/485 |
| 6,289,280 B1 | 9/2001 | Fernandez-Corbaton et al. | |
| 6,313,786 B1 | 11/2001 | Sheynblat et al. | |
| 6,353,743 B1 | 3/2002 | Karmel | |
| 6,459,903 B1 | 10/2002 | Lee | |
| 7,010,556 B1 * | 3/2006 | Marro et al. | 708/300 |
| 7,012,772 B1 | 3/2006 | Vis | |
| 2002/0132624 A1 * | 9/2002 | Watanabe et al. | 455/456 |
| 2004/0210389 A1 * | 10/2004 | Zimmerman et al. | 701/213 |

OTHER PUBLICATIONS

International Search Report and Written Opinion—PCT/US2003/012938, International Search Authority—European Patent Office—Feb. 4, 2004.

* cited by examiner

B₁: THE POSITION OF A BASESTATION (OR AN SPS SATELLITE)
P: THE LOCATION OF A MOBILE STATION
A: THE FIRST ESTIMATED POSITION OF THE MOBILE STATION
d₁: THE DISTANCE FROM THE BASESTATION TO THE MOBILE STATION $B_l$: THE POSITION OF A BASESTATION (OR AN SPS SATELLITE)
$P$: THE LOCATION OF A MOBILE STATION
$A$: THE FIRST ESTIMATED POSITION OF THE MOBILE STATION
$d_l$: THE DISTANCE FROM THE BASESTATION TO THE MOBILE STATION
$c_l$: THE CORRECTION VECTOR BASED ON $B_l$, $d_l$, AND $A$ $B_1$: THE POSITION OF A BASESTATION (OR AN SPS SATELLITE)
$A$: THE ASSUMED POSITION OF THE MOBILE STATION
$d_1$: THE DISTANCE FROM THE BASESTATION TO THE MOBILE STATION
$\varepsilon$: ERROR (OR RESIDUAL) IN THE MEASUREMENT OF $d_1$
$\varepsilon_0$: UNCERTAINTY IN THE ORTHOGONAL CONSTRAINT

METHOD AND APPARATUS FOR LOCATION DETERMINATION IN A WIRELESS ASSISTED HYBRID POSITIONING SYSTEM

RELATED APPLICATIONS

Claim of Priority Under 35 U.S.C. §120

The present Application is a Divisional of, and claims priority to U.S. patent application Ser. No. 10/423,251, filed Apr. 24, 2003 entitled, "Method and Apparatus for Location Determination in a Wireless Assisted Hybrid Positioning System", by the inventors hereof, which claims priority to U.S. Provisional Application Ser. No. 60/375,965, filed on Apr. 25, 2002, and assigned to the assignee hereof and hereby expressly incorporated by reference herein.

FIELD

The disclosed method and apparatus relates to a location determination process, and more particularly to a wireless assisted hybrid positioning system.

BACKGROUND

To calculate the position of a device within a wireless cellular network (e.g., a mobile device, such as a cellular telephone within a cellular telephone network), several approaches use "multilateration" ("triangulation" in the case of three transmitters). Multilateration use measurements of the arrival timing of signals sent by several transmitters (such as basestations) and a received at a receiver (such as a mobile device) to determine the location of the receiver. For example, one approach, called Advanced Forward Link Trilateration (AFLT) (also known as Enhanced Observed Time Difference (EOTD)), measures at the mobile device the times of arrival of signals transmitted from each of several basestations. These arrival time measurements are transmitted to a Position Determination Entity (PDE), also called a location server, which computes the position of the mobile device using these arrival time measurements. The times-of-day at these basestations are synchronized such that the time-of-day at each basestation is the same to within a specified error. The accurate positions of the basestations and the arrival time measurements are used to determining the position of the mobile device.

FIG. 1 shows an example of an AFLT system where the arrival time measurements (TR1, TR2, and TR3) of signals from cellular basestations 101, 103, and 105 are measured at a mobile device, such as a mobile cellular telephone 111. These arrival time measurements may then be used to compute the position of the mobile device. Such computation may be done at the mobile device itself, or at a location server if the timing information obtained by the mobile device is transmitted to the location server via a communication link. Typically, the arrival time measurements are communicated to a location server 115 through one of the cellular basestations (e.g., basestation 101, or 103, or 105). The location server 115 is coupled to receive data from the basestations through the mobile switching center 113. The mobile switching center 113 provides signals (e.g., voice communications) to and from a land-line Public Switched Telephone Network (PSTN) so that signals may be conveyed to and from the mobile device to other communication devices, such as other land-line phones on the PSTN or other mobile telephones. In some cases the location server may also communicate with the mobile switching center via a cellular link. The location server may also monitor emissions from several of the basestations in an effort to determine the relative timing of these emissions.

In another method called Time Difference of Arrival (TDOA), the arrival time of a signal from a mobile device is measured at several basestations. FIG. 1 applies to this case if the arrows of TR1, TR2, and TR3 are reversed. This timing data may then be communicated to the location server to compute the position of the mobile device.

Yet a third method involves the use of a receiver in the mobile device for receiving signals from a Satellite Positioning System (SPS), such as the United States Global Positioning Satellite (GPS) system, the Russian Glonass system, the proposed European Galileo System or any other such satellite navigation system. Alternatively, a combination of satellites and "pseudolites" may be used. Pseudolites are ground based transmitters that broadcast a PN code (similar to a GPS signal) modulated on an L-band carrier signal, generally synchronized with SPS time. Each pseudolite may be assigned a unique PN code so as to permit identification by a remote receiver. Pseudolites are useful in situations where SPS signals from an orbiting satellite might be unavailable, such as in tunnels, mines, buildings or other enclosed areas. The term "navigational transmitter", as used herein, is intended to include any satellite, communication base station, pseudolite, or equivalent of a pseudolite. The terms "airborne navigational transmitter" and terrestrial navigational transmitter" are used to distinguish between those navigational receivers that are earth bound and those that are not. The term SPS signals as used herein is intended to include any signal transmitted by a navigational transmitter. Such SPS methods may utilize a cellular network to either provide assistance data or share in the processing required to calculate the position of the SPS receiver. Alternatively, such a method may be completely autonomous (i.e., not utilize a cellular network). Examples of such a method are described in U.S. Pat. Nos. 5,841,396; 5,945,944; and 5,812,087. In practical low-cost implementations, both a cellular communications receiver of the mobile device and the SPS receiver are integrated into the same enclosure and, in some cases, may share common electronic circuitry.

A combination of either the AFLT method or TDOA method with an SPS method is referred to herein as a "hybrid" method.

In yet another variation of the above methods, the round trip delay (RTD) is calculated for signals that are sent from the basestation to the mobile device and back. In a similar, but alternative, method the round trip delay is calculated for signals that are sent from the mobile device to the basestation and back. In each of these cases, the round-trip delay is divided by two in order to determine an estimate of the one-way time delay. Knowledge of both the location of the basestation and the one-way delay constrains the location of the mobile device to a circle on the earth. If the location of a second basestation and the one-way delay from the second basestation to the mobile device is know, then the result is the intersection of two circles, which in turn constrains the location of the mobile device to two points on the earth. Knowledge of a third basestation and delay (or even an angle of arrival or information regarding the cell sector in which the mobile device resides) may resolve the ambiguity as to which of the two points is the location of the mobile device.

In a positioning system based upon multilateration, there are typically four primary unknowns. In a system based on Cartesian coordinates, the four unknowns include three components of the mobile device's position (x, y, and z, which may represent latitude, longitude, and altitude) and a "clock bias" of the mobile device. The clock bias is the difference between the time maintained by the clock in the mobile device and the time maintained in the transmitters, assuming that the time maintained in each transmitter is perfectly synchronized with each of the other transmitters. In the case of GPS satellites, the clock in each satellite is an atomic clock. The accuracy provided by the atomic clocks allows the time in each satellite to be very nearly in perfect synchronization. It will be clear to those skilled in the art that to solve for the four unknowns and form an estimate of the position of the mobile device, at least four independent equations must be obtained. If one of the four unknowns can be estimated or is known, such as the altitude, then only three independent equations are required. Knowledge of the location of a satellite, the time at which a signal was transmitted from that satellite and a measurement of the arrival time of a signal transmitted from that satellite provide sufficient information to form one independent equation. Each additional satellite and associated set of timing information adds one additional independent equation.

An iterative position determination procedure typically starts with an a-priori estimated position. Then, the estimated position is improved with each iteration. Based on the estimated position, a position correction vector and an improved estimation of the clock bias are determined. In a SPS system, four independent equations can be used to solve for four unknowns using a well known least squares iterative solution improvement approach.

The least squares solution to these equations provides an adjustment to the a-priori solution. Each measurement may also be weighted appropriately. A weighting process can help to improve accuracy when the a-priori accuracy estimate for each measurement input varies significantly. For example, U.S. Pat. No. 6,313,786 contains descriptions of an error estimation process and weighting scheme.

Altitude aiding has been used in various methods for determining the position of a mobile device. Altitude aiding is typically based on a pseudo-measurement of the altitude. Knowing the altitude of a mobile device constrains the possible positions of the mobile device to the surface of a sphere (or an ellipsoid) with the sphere's center located at the center of the earth. This knowledge may be used to reduce the number of independent arrival time measurements required to determine the position of the mobile device. Typically, an estimated altitude can be: (1) manually supplied by the operator of the mobile device, (2) set to an altitude from a previous three-dimensional solution, (3) set to a predetermined value, or (4) derived from mapping information (such as a topographical or geodetic database) maintained at a location server.

U.S. Pat. No. 6,061,018 describes a method by which an estimated altitude is determined from information of a "cell object". The cell object is a cell site that has a cell site transmitter in communication with the mobile device. U.S. Pat. No. 6,061,018 also describes a method of determining the condition of the measurements of the pseudoranges from a plurality of SPS satellites by comparing an altitude calculated from the pseudorange measurements with the estimated altitude.

SUMMARY

One embodiment of the disclosed method to determine a position of a mobile device in a positioning system includes computing a second estimated position of a mobile device using a first assumed geometric relationship between the location of the mobile device and a navigational transmitter. The first geometric relationship is linearly independent from both the altitude of the mobile device and a second geometric relationship. The second geometric relationship is based on range information (e.g., a range from the mobile device to the navigational transmitter, a pseudorange, an arrival time, or a round trip time) measured with respect to the navigational transmitter.

In one example of this embodiment, the first geometric relationship is determined by a correction vector related to a difference between a first estimated position of the mobile device and the second estimated position. The second estimated position is computed from the correction vector and the first estimated position. The first geometric relationship specifies a first component of the correction vector along a first direction that is not parallel to a second direction pointing from the navigational transmitter to the first estimated position. The first geometric relationship is weighted against other relationships for determining the correction vector. The weight for the first geometric relationship may be determined from: a) an estimated error in a clock bias of the mobile device; b) an estimated error in the range information measured with respect to the navigational transmitter; and/or c) an estimated range from the navigational transmitter to the first estimated position of the mobile device.

In another example of this embodiment, the first direction is orthogonal to the second direction and in the horizontal plane; and the first component of the correction vector is assumed to be zero. Coefficients of a linear equation for specifying the first component of the correction vector are computed to determine the correction vector.

In yet another example of this embodiment, the first estimated position is obtained from a direction determined by an antenna of the navigational transmitter.

Another embodiment of the disclosed method to determine a position of a mobile device in a positioning system includes: determining an estimated clock bias based on the strength of a signal transmitted from a navigational transmitter to the mobile device. An estimated position of the mobile device is determined using the estimated clock bias. The estimated clock bias is weighted against other constraints in determining the estimated position of the mobile device. In one example if this embodiment, an Estimated Input Power (EIP) is used as an indication of the signal strength. Parameters (e.g., Ec/10 and total pilot power) sent from a basestation in an IS-801 message are received and may be used to compute the Estimated Input Power (EIP).

The presently disclosed method and apparatus includes data processing systems which perform these methods and computer readable media which, when executed on data processing systems, cause the systems to perform these methods.

Other features will be apparent from the accompanying drawings and from the detailed description that follows.

BRIEF DESCRIPTION OF THE DRAWINGS

The presently disclosed method and apparatus is illustrated by way of the following figures in which like references indicate similar elements.

DETAILED DESCRIPTION

The following description and drawings are illustrative of the disclosed method and apparatus and are not to be construed as limiting the disclosed method and apparatus. Numerous specific details are described to provide a thorough understanding of the disclosed method and apparatus. However, in certain instances, well-known or conventional details are not described in order to simplify the description of the disclosed method and apparatus.

Figure 2:
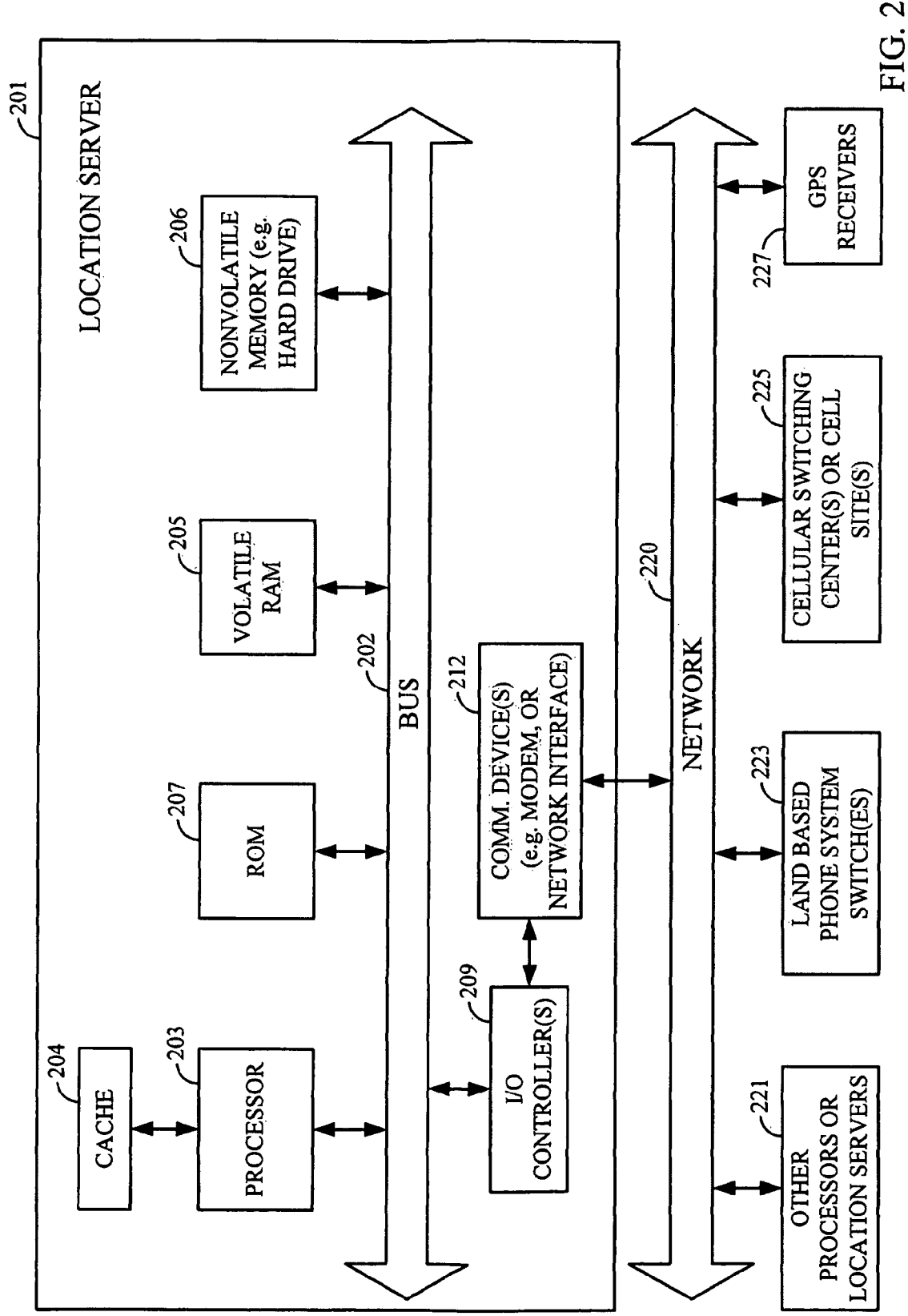
FIG. 2 shows an example of a location server which may be used with the presently disclosed method and apparatus.

FIG. 2 shows an example of a data processing system that may be used as a server in various embodiments of the disclosed method and apparatus. For example, as described in U.S. Pat. No. 5,841,396, the server may provide assistance data such as Doppler or other assistance data to the SPS receiver in a mobile device. In addition, or alternatively, the location server may perform the final position calculation rather than the mobile device (after receiving pseudoranges or other data from which pseudoranges can be determined from the mobile device) and then may forward this position determination to the basestation or to some other system. The data processing system as a location server typically includes communication devices 212, such as modems or network interface. The location server may be coupled to a number of different networks through communication devices 212 (e.g., modems or other network interfaces). Such networks include the cellular switching center or multiple cellular switching centers 225, the land based phone system switches 223, cellular basestations, other SPS signal sources 227, or other processors of other location servers 221.

Figure 1:
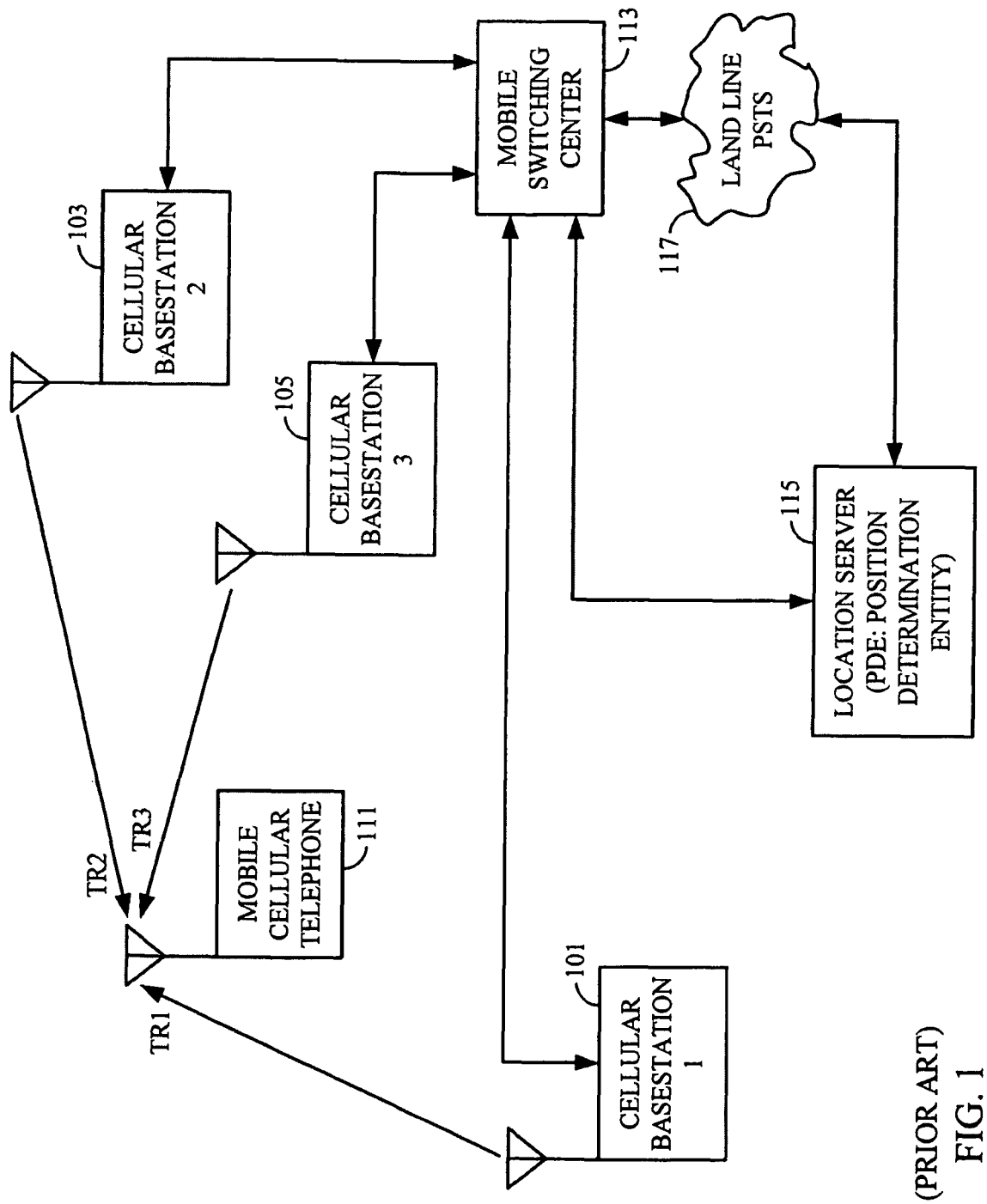
FIG. 1 shows an example of a prior art cellular network which determines the position of a mobile device.

Multiple cellular basestations are typically arranged to cover a geographical area with radio coverage, and these different basestations are coupled to at least one mobile switching center, as is well known in the prior art (e.g., see FIG. 1). Thus, multiple basestations would be geographically distributed but coupled together by a mobile switching center. The network 220 may be connected to a network of reference SPS receivers that provide differential SPS information. The network 220 may also provide SPS ephemeris data for use in calculating the position of mobile device. The network is coupled through the modem or other communication interface to a microprocessor 203. The network 220 may be connected to other computers or network components. Network 220 may also be connected to computer systems operated by emergency operators, such as the Public Safety Answering Points that respond to 911 telephone calls. Various examples of methods for using a location server have been described in numerous U.S. patents, including: U.S. Pat. Nos. 5,841,396; 5,874,914; 5,812,087; and 6,215,442.

The location server 201, which is one form of a data processing system, includes a bus 202. The bus is coupled to a microprocessor 203, a ROM 207, a volatile RAM 205, and a non-volatile memory 206. The microprocessor 203 is coupled to cache memory 204, as shown in the example of FIG. 2. The bus 202 interconnects these various components together. While FIG. 2 shows that the non-volatile memory is a local device coupled directly to the rest of the components in the data processing system, it will be appreciated that the disclosed method and apparatus may utilize a non-volatile memory which is remote from the system, such as a network storage device which is coupled to the data processing system through a network interface, such as a modem or Ethernet interface. The bus 202 may include one or more buses connected to each other through various bridges, controllers and/ or adapters as are well known in the art. In many situations the location server may perform its operations automatically without human assistance. In some designs where human interaction is required, the I/O controller 209 may communicate with displays, keyboards, and other I/O devices.

Note that while FIG. 2 illustrates various components of a data processing system, it is not intended to represent any particular architecture or manner of interconnecting the components, since such details are well known and not germane to the disclosed method and apparatus. It will also be appreciated that network computers and other data processing systems which have either fewer or more components may also be used with the disclosed method and apparatus, and may act as a location server or a PDE.

It will be apparent from this description that aspects of the disclosed method and apparatus may be embodied, at least in part, in software. That is, the techniques may be carried out in a computer system or other data processing system in response to its processor executing sequences of instructions contained in memory, such as ROM 207, volatile RAM 205, non-volatile memory 206, cache 204 or a remote storage device. In various embodiments, hardwired circuitry may be used in combination with software instructions to implement the disclosed method and apparatus. Thus, the techniques are not limited to any specific combination of hardware circuitry and software, nor to any particular source for the instructions executed by the data processing system. In addition, throughout this description, various functions and operations are described as being performed or caused by software code to simplify the present description. However, those skilled in the art will recognize that such expressions mean that the functions are a result of the execution of the code by a processor, such as the microprocessor 203.

In some embodiments, the disclosed methods may be performed on computer systems that are simultaneously used for other functions, such as cellular switching, messaging services, etc. In one embodiment in which this is the case, some or all of the hardware of FIG. 2 is shared for several functions. A data processing system, with more or less components, may also be used in a mobile device to perform computations for location determination.

When arrival time measurements made from signals transmitted from terrestrial navigational transmitters are used, there is often a large directional uncertainty that is difficult to account for with traditional methods. The distance between a basestation to the mobile device is relatively small when compared to the distance between an airborne navigational transmitter and the mobile device. A small change in the estimated position of a mobile device can result in a large change in the geometric (i.e., angular) relationship (e.g., direction cosine elements for the vector pointing from a basestation to the mobile device) between the mobile device and the terrestrial navigational transmitter, such as in an Advanced Forward Link Triangulation (AFLT) system.

For example, if the mobile device is very close to a basestation, the direction from the basestation to the mobile device changes significantly when the position of the mobile device changes relatively slightly. Such significant changes in the geometric relationship may lead to unstable or unpredictable solutions in an iterative solution procedure. Thus, it becomes difficult to estimate the direction (i.e., the "direction cosine elements") with adequate accuracy when the mobile device is very close to the basestation. Even a small initial error in the iterative process can lead to a large error in the final solution. In such cases, the primary measurement equation may be de-weighted to account for this directional uncertainty. But such an approach may "water down" the navigation solution accuracy. Thus, it is desirable to have a solution procedure that can reach a stable, convergent and accurate navigation solution when measurements from terrestrial navigational transmitters are used.

In at least one embodiment of the disclosed method and apparatus geometric relationships are assumed between a terrestrial navigational transmitter and a mobile device. Such assumptions can be made by specifying limits on the location of a mobile device in relationship to an estimated position of the mobile device and the positions of the terrestrial navigational transmitter in order to stabilize the iterative solution procedure and improve the position solution of the mobile device.

It should be appreciated that the addition of a basic measurement equation into the iterative weighted least squares process may lead to instabilities if the assumed position of the mobile device is near the basestation. This is due to the fact that the estimated direction from the basestation to the assumed position is sensitive to the assumed position. Thus, in one embodiment of the disclosed method and apparatus, an orthogonal constraint is added to stabilize the solution. The constraint limits the solution to a certain angular region about the basestation. The orthogonal constraint is determined based upon what is known and unknown. As the assumed position becomes closer to the basestation, the orthogonal constraint becomes more and more accurate, whereas the traditional range constraint, must be de-weighted somewhat to account for its directional uncertainty. For example, the weight for the orthogonal constraint can be increased as the assumed position becomes closer to the basestation; or the weights for the traditional range constraints can be decreased as the assumed position becomes closer to the basestation. Furthermore, the traditional measurement's residual may also be modified to account for the curved nature of the potential solution area.

Figure 3:
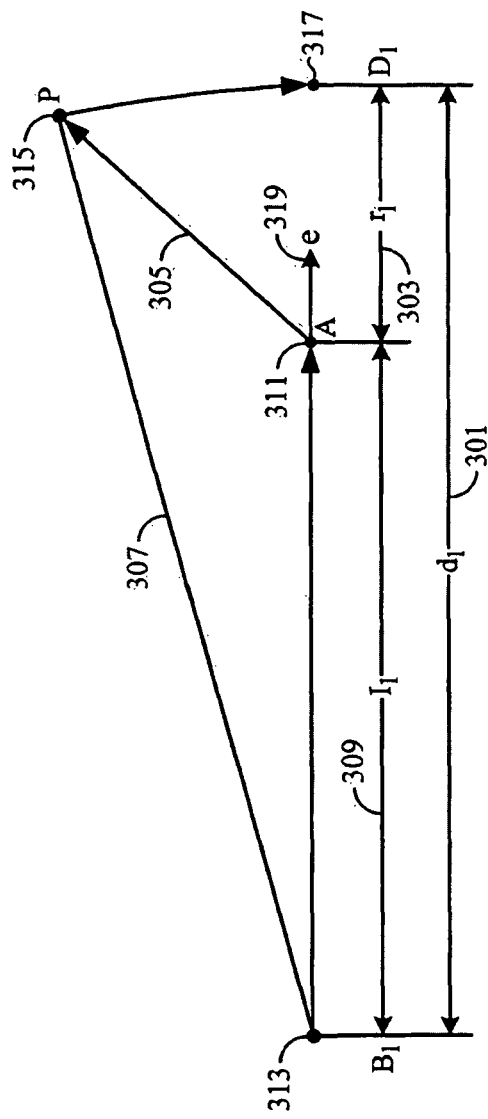
FIG. 3 shows a typical method to establish a linear geometric relationship for determining a position of a mobile device.

FIG. 3 shows a typical method to establish a linear geometric relationship for determining a position of a mobile device. Typically, range information (e.g., a range from the mobile device to a basestation, a pseudorange, a arrival time, a round trip time, or other such value) is determined from timing measurements of a signal transmitted between a navigational transmitter and the mobile device. Such range information typically is used to establish a range constraint which specifies a distance $d_1$ (301) between a navigational transmitter $B_1$ (313) and mobile device P (315). When a first estimated position A (303) of a mobile device is determined, a subsequent estimated position of the mobile device can be determined by solving for a correction vector AP (305). A geometric relationship can be established for the correction vector AP (305) based on the range information. For example, a typical linearized range constraint specifies that the projection of the correction vector in the direction e (319) is equal to the difference between distance $d_1$ and distance $l_1$; wherein the distance $l_1$ is the distance between the basestation $B_1$ and the first estimated position A. From the first estimated position A and the known position of the basestation $B_1$, the direction cosines elements of the vector e (319) pointing from the basestation B1 to the first estimated position A can be computed as $(a_1, b_1, c_1)$. Thus, a linear equation for the correction vector (x, y, z) can be specified as:

$$a_1 x + b_1 y + c_1 z = r_1$$

When the range information is specified as an arrival time measurement, $t_1$, distance $d_1$ can be expressed as $d_1 = c(t_1 - t)$, where c is the speed of light, and t is the clock bias of the mobile device. Therefore, the linear equation can be rewritten as:

$$a_1 x + b_1 y + c_1 z + ct = ct_1 - l_1$$

Figure 4:
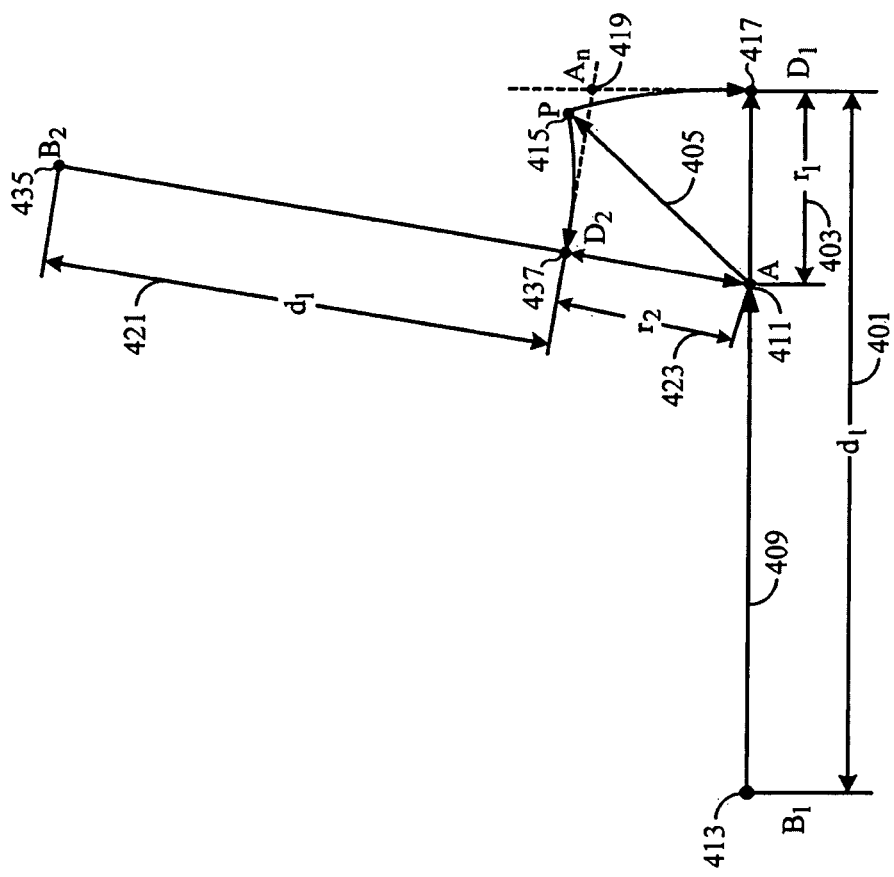
FIG. 4 illustrates a typical method to determine a position of a mobile device.

FIG. 4 illustrates a typical method to determine a position of a mobile device. The first estimated position A (411) of the mobile device, the known position of basestation $B_1$ (413), and the distance between the first estimated position A and the basestation $B_1$ determine that the component of the correction vector along line $B_1 A$ is $r_1$. Thus, the position of the second estimated position of the mobile device is on line $A_n D_1$, according to the linearized range constraint based on basestation $B_1$ (413). Similarly, the first estimated position A (411) of the mobile device, the known position of basestation $B_2$ (435), and the distance between the first estimated position A and the basestation $B_2$ determine that the component of the correction vector along line $B_2 A$ is $r_2$, according to the linearized range constraint based on basestation $B_2$ (435). Thus, the position of the second estimated position of the mobile device is also on line $A_n D_2$. From these two geometric relationships, the second estimated position of the mobile device can be determined at $A_n$ for a two-dimensional example.

In general, from four arrival time measurements corresponding to four different navigational transmitters, the correction vector (x, y, z) and the clock bias can be solved. When there are more than four such measurements, a Least Mean Square (LMS) procedure (or other numerical procedures) can be used to solve a solution that "best" satisfies all these geometric relationships based on the range information.

The above linearized range constraint is based on the estimated position of the mobile device (e.g., the direction cosine elements $a_1, b_1, c_1$). When an updated estimation of the position is obtained, these geometric relationships (e.g., the direction cosine elements) can be updated accordingly to account for the change in geometry. A updated linearized range constraint can then be established.

Figure 5:
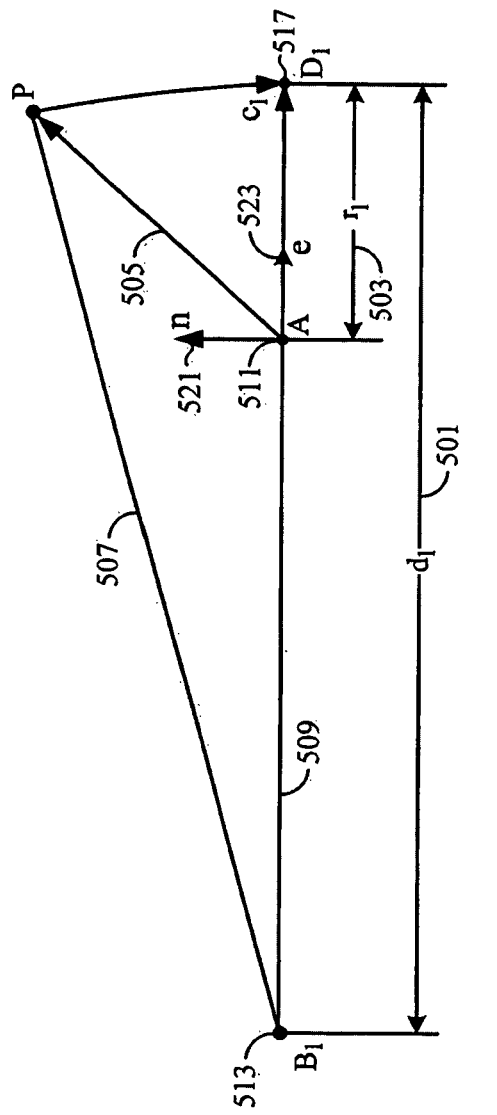
FIG. 5 illustrates a method to establish an assumed linear geometric relationship for determining a position of a mobile device according to one embodiment of the presently disclosed method and apparatus.

FIG. 5 illustrates a method to establish an assumed linear geometric relationship for determining a position of a mobile device according to one embodiment of the disclosed method and apparatus. In addition to the traditional range constraint, which specifies the component of the correction vector AP (505) along the direction e (523) pointing from the basestation $B_1$ to the first estimated position (A) of the mobile device, an assumed geometric relationship is used. The assumed geometric relationship specifies that the component of the correction vector along direction n (521) is zero. Since direction n (521) is orthogonal to direction e (523), in which a traditional linearized range constraint is specified, such a geometric constraint is called an orthogonal constraint. When an orthogonal constraint is used with a linearized range constraint in a two-dimensional example, a second estimated position of the mobile device can be determined at $D_1$ (517). Note that in a three-dimensional case, two linearly independent orthogonal constraints can be assumed for each navigational transmitter with a range constraint. When such assumed geometric relationships are used, a "best" estimation can be performed to determined an estimated position of the mobile device if there are not enough independent range measurements to determine the accurate position of the mobile device; and an accurate position of the mobile device can be determined if there are enough independent range measurements and a weighting procedure (e.g., LMS) is applied. Further, such assumed geometric relationships can stabilize the iteration solutions by imposing further constrains on solutions and preventing the solution from wandering away from a region for reasonable solutions.

Assuming the direction cosine elements of direction n (521) are $(a'_1, b'_1, c'_1)$, an orthogonal constraint can be written as:

$$a'_1 x + b'_1 y + c'_1 z = 0$$

In one example of the disclosed method and apparatus, direction n is not only perpendicular to direction e, but also in the horizontal plane. Thus, $c'_1 = 0$; and the orthogonal constraint is:

$$a'_1 x + b'_1 y = 0$$

In an orthogonal constraint, the only parameters that vary are the direction cosine elements based upon the current estimate position and its weight, depending primarily upon a-priori clock uncertainty, measurement uncertainty, and the a-priori estimated range from the basestation. The residual is always zero, by definition, but for each subsequent iteration of the LMS solution, the clock and range estimates may change, impacting the weight of the orthogonal constraint.

Alternatively, other assumptions about the location of the mobile device in relation to the assumed position of the mobile device and the positions of the navigational transmitters may be used to constrain the solutions. For example, assuming components of the correction vector in other directions other than that orthogonal to direction pointing from the basestation to the mobile device.

Figure 6:
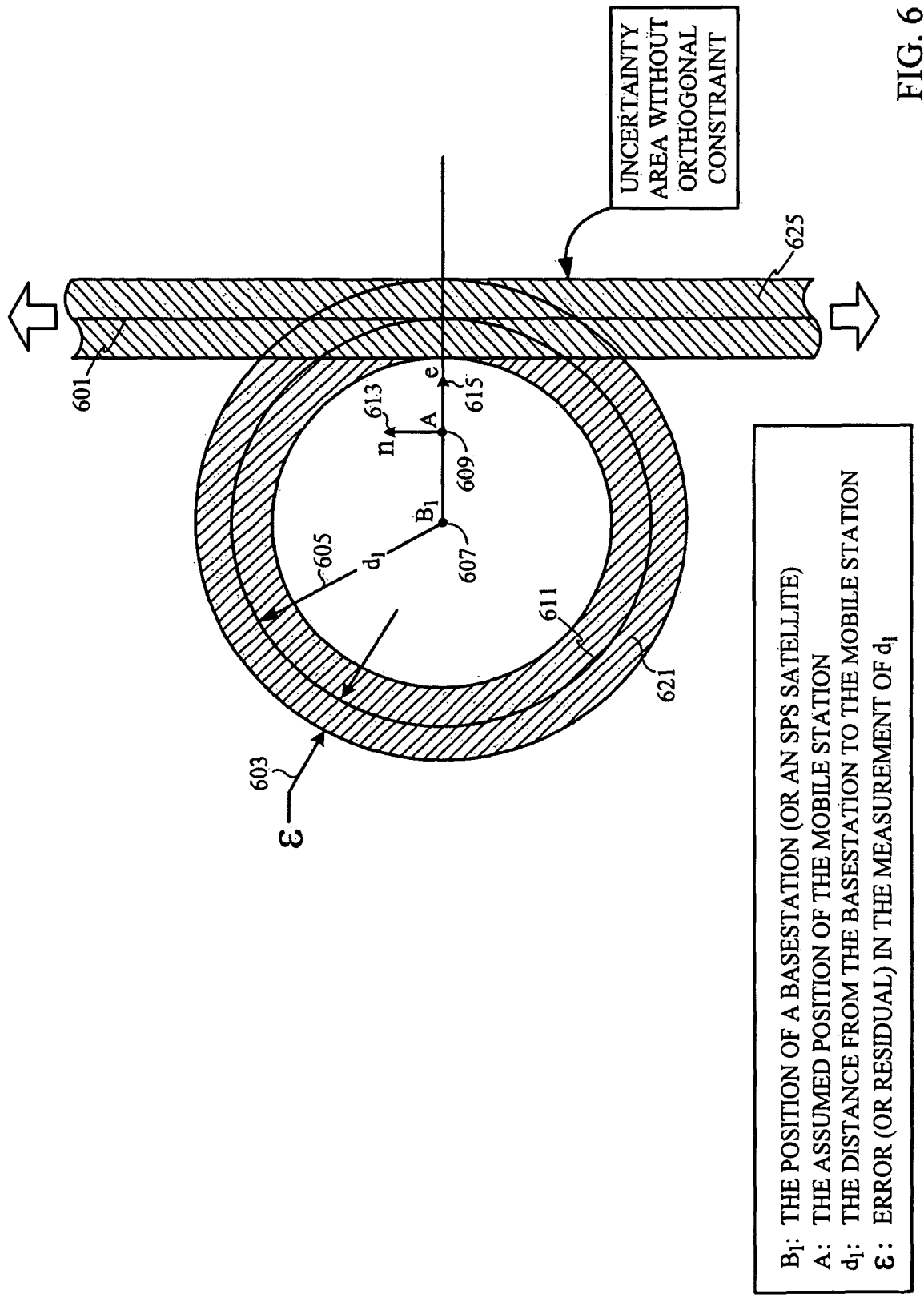
FIG. 6 illustrates the uncertainty area in a solution when a tradition linear geometric relationship based on range information.

FIG. 6 illustrates the uncertainty area in a solution when a tradition linear geometric relationship based on range information. When the range between the basestation and the mobile device is $d_1$, the position of the mobile device is constrained on circle 611 in a two-dimensional case. When the estimated error in the measurement of range $d_1$ is $\epsilon$ (603), the uncertainty area associated with the range measurement is ring 621. When the range constraint is linearized, range $d_1$ constrains the solution of the second estimated position of the mobile device to line 601. When the estimated error in the measurement of range $d_1$ is $\epsilon$ (603), the uncertainty area associated with the linearized range measurement is strip 625, stretching to infinity in two directions. The linearized range constraint restricts the solution to the location of the mobile device in direction e (615), but not in direction n (613). Thus, the linearized range constraint allows the second estimated position to be in an area far away from the permissible region of ring 621. This may cause unstable or unpredictable solutions.

Figure 7:
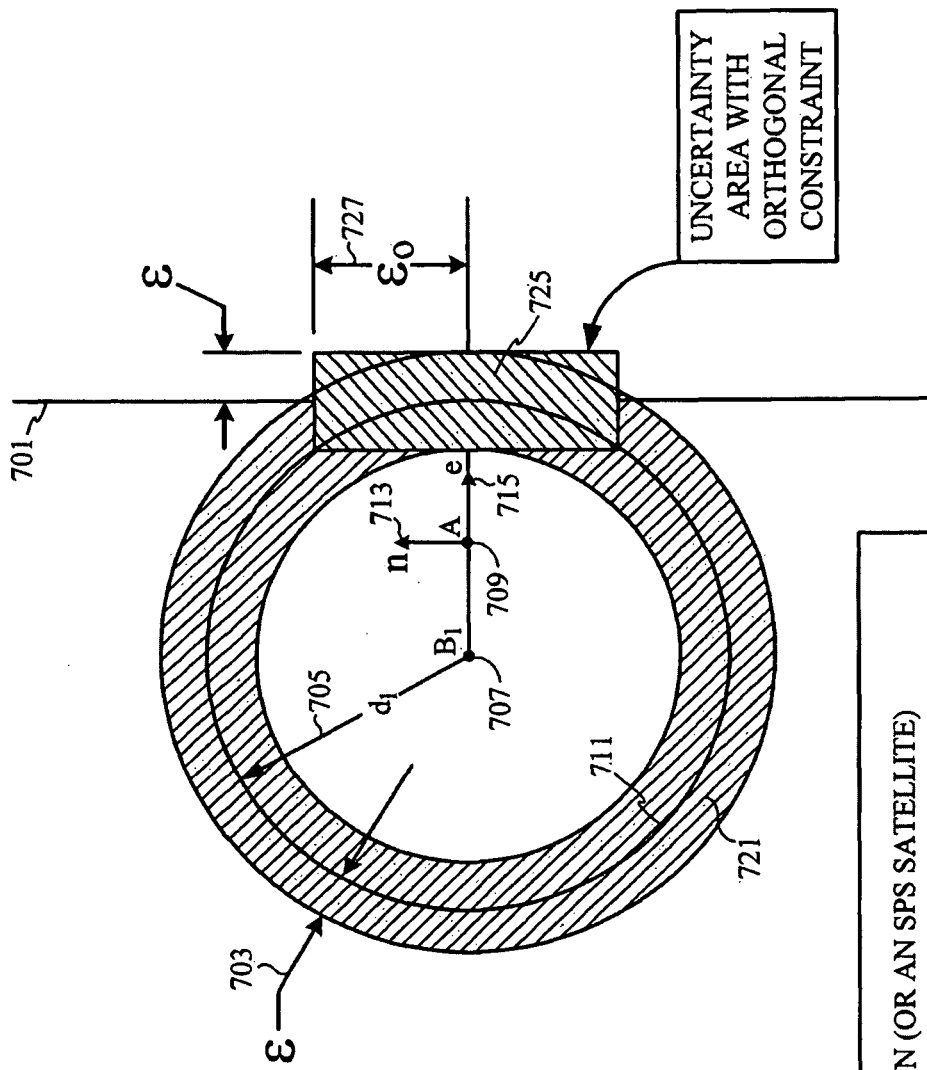
FIG. 7 illustrates the uncertainty area in a solution when an assumed geometric relationship is used according to one embodiment of the presently disclosed method and apparatus.

FIG. 7 illustrates the uncertainty area in a solution when an assumed geometric relationship is used according to one embodiment of the disclosed method and apparatus. Similar to that in FIG. 6, when the estimated error in the measurement of range $d_1$ is $\epsilon$ (603), the uncertainty area associated with the range measurement is ring 721. Since the linearized range constraint restricts the solution in direction e (715) with uncertainty e and the orthogonal constraint restricts the solution in direction n (713) with uncertainty $\epsilon_0$, the solution to the second estimated position is limited in area 725, which is much smaller than strip 625 (in FIG. 6) when no orthogonal constraint is used. Thus, the orthogonal constraint can stabilize the iterative solution procedure by limiting the solution to a reasonable permissible area.

When less than four measurements are available, it is not generally possible to form a navigation solution. For a wireless assisted hybrid method, four or more independent measurements are often available, such as altitude information and others. However, some measurements from the wireless assisted hybrid method contain some unique nonlinearities. At least one embodiment of the disclosed method and apparatus seeks to establish linearized constraints from such measurements for use in a generalized hybrid method.

Only 1 or 2 time delay measurements for signals traveling between the mobile device and the navigational transmitters are available in many situations. In these cases, a traditional navigation solution would not be possible. Even with more measurements, stability can be a problem when the mobile device is very close to a basestation (or a pseudolite). This is particularly common when the signal from the serving basestation, through which the mobile device communicates, is so strong that no signal from other basestations could be received, and when no airborne navigational transmitter based measurements are available. Such a near-far problem is common to CDMA-based systems. In such a situation, the mobile device is likely to be close to the basestation. Traditional navigation algorithms have no way of describing such a situation and are likely to become unstable due to large directional uncertainty, possibly returning a less accurate "cell sector" solution. In these cases, additional constraints could bound the solution, keeping it constrained to stable areas. It should be noted that in some situations where the mobile device is very close to the basestation, an approximate distance may be inferred based simply upon signal strength. A model for this observable is needed to provide an appropriate equation input into the least squares navigation solution. Even though in some cases the accuracy of a navigation solution that relies upon these coarse constraints may be relatively poor, it is still sufficient to further constrain ongoing signal searches and would be suitable for some location-based services, and should therefore prove very valuable.

The clock bias of a mobile device can be constrained by an estimated range between the mobile device and the basestation. A coarsely estimated range can be obtained from an empirical function for a given measure of signal strength (e.g., Estimated Input Power). Alternative, it may be based upon a more accurate round-trip time measurement.

The signal strength can help to establish how far the mobile device was likely to have been from the serving basestation; and this, in turn, can be used to estimate the clock state of the mobile device. Once the signal strength is converted into an estimated clock bias, the clock estimate can be directly entered into the navigation equations to stabilize the solution and constrain it to only reasonable clock biases. Furthermore, this a-priori clock estimate can be used to better weight the position constraints associated with each network measurement. The clock bias constraint equation is of the form:

$$t=c_b,$$

where $c_b$ the estimated clock bias from the estimated range to the basestation. The estimated clock bias $c_b$ may be determined from $t_1-d_e/c$, where $d_e$ is the estimated range to the basestation; $t_1$ is the measurement of the arrival time of a signal transmitted from the basestation to the mobile device; and c is the speed of light.

In one embodiment of the disclosed method and apparatus, the estimate range is determined from the following equation:

$$d_e=\text{MaxAntennaRange}*0.5*pow(10.0,(-125-EIP)/30.0)$$

where EIP (dBm)=Ec/I0 (dB)+I0 (dBm). Parameter Ec/I0 and total pilot power I0 may be received in the IS-801 message.

The above equation assumes that received signal power decreases as a function of range to the 3rd power; and it also assumes a certain minimum power level for the wireless network. Alternatively, a more generalized equation based upon the pilot transmitter power, terrain type, antenna patterns, and other salient parameters of each cell sector can be used. It should be appreciated that the same sort of link analysis could be used for networks that do not have pilots, using whatever signal strength, transmitter power, and antenna information is available for each appropriate signal type.

Figure 8:
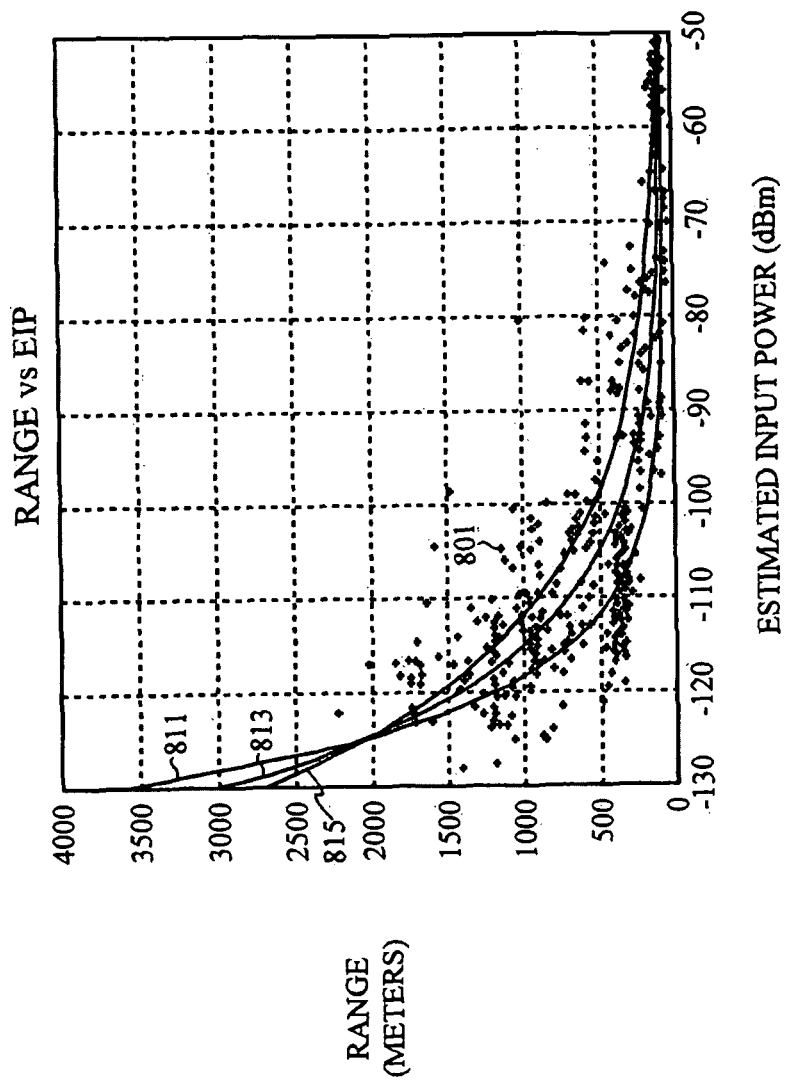
FIG. 8 shows methods to correlate Estimated Input Power with range between a basestation and a mobile device according to one embodiment of the presently disclosed method and apparatus.

FIG. 8 shows methods to correlate Estimated Input Power with range between a basestation and a mobile device according to one embodiment of the disclosed method and apparatus. Data points (e.g., 801) of range from a basestation to a mobile device versus Estimated Input Power of pilot signals transmitted from a basestation to a mobile device can be collected from precise measurements. For example, a mobile device can be driven around in a van while recording the Estimated Input Power versus the corresponding range. The data points can be curve fitted to generate an empirical function that maps an Estimated Input Power to an estimated range. Since Estimated Input Power is affected by factors such as terrain conditions, different empirical functions may be generated for different reception conditions. FIG. 8 show three different empirical functions (811, 813 and 815) derived from data actually collected. From FIG. 8 it is seen that the range to the basestation is relatively small when the signals are very strong; whereas when the signal is weaker, the range has much more uncertainty.

Figure 9:
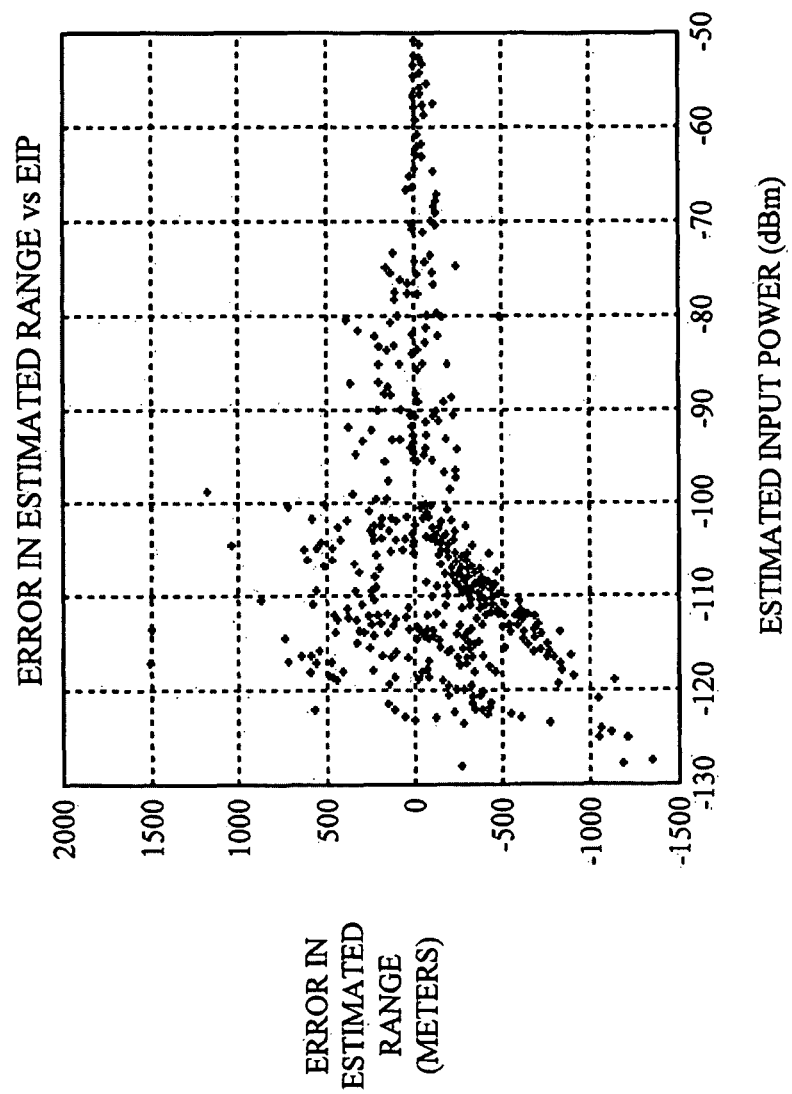
FIG. 9 shows error in estimated range for one example correlation between Estimated Input Power and range correlated according to one embodiment of the presently disclosed method and apparatus.

FIG. 9 shows error in estimated range for one example correlation between Estimated Input Power and range correlated according to one embodiment of the disclosed method and apparatus. The error in estimated range in FIG. 9 is the difference between the estimated range derived from the empirical function 813 and the measured range for a corresponding data point (e.g., 801 in FIG. 8). FIG. 9 shows that the stronger the Estimated Input Power, the more accurate the estimated range derived from the empirical functions. Thus, the estimated range derived from the empirical functions can be weighted according to the distance between the mobile device and the basestation in solving for an estimated position of the mobile device.

When the clock bias is estimated from a signal strength indicator (e.g., using curve 813 in FIG. 8), the error in the estimation is predictably a function of input power. Thus, the coarse time aiding input can be weighted as a function of input power, along with any other potential sources of inconsistency, such as handset calibration uncertainties, forward link calibration uncertainties, or mobile device time offsets (also known as Tx/Rx delays).

Figure 10:
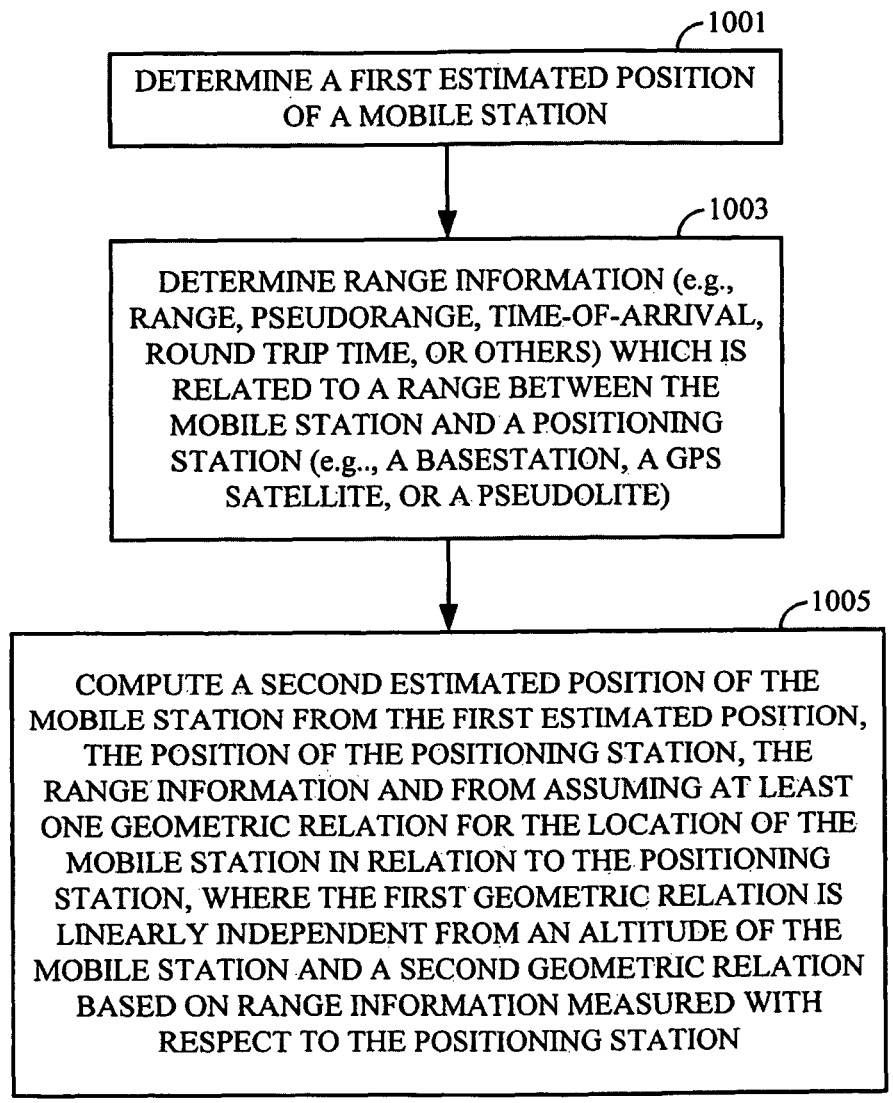
FIG. 10 shows an overall flow chart of a method to determine an estimated position of a mobile device according to one embodiment of the presently disclosed method and apparatus.

FIG. 10 shows an overall flow chart of a method to determine an estimated portion of a mobile device according to one embodiment of the disclosed method and apparatus. Operation 1001 determines a first estimated position of a mobile device. Operation 1003 determines range information, such as measurements of range, pseudorange, arrival time, round trip time, etc., for the mobile device in relation to one or more navigational transmitters. Typically, the range information is used to establish traditional linearized range constraints. Operation 1005 computes a second estimated position of the mobile device from the first estimated position, the position of the navigational transmitter, the range information and from assuming at least one geometric relationship for the location of the mobile device in relation to a navigational transmitter. The first geometric relationship is linearly independent from the altitude of the mobile device and a second geometric relationship based on range information measured with respect to the navigational transmitter. In one embodiment of the disclosed method and apparatus, orthogonal constraints are assumed to stabilize and improve the position solutions.

Figure 11:
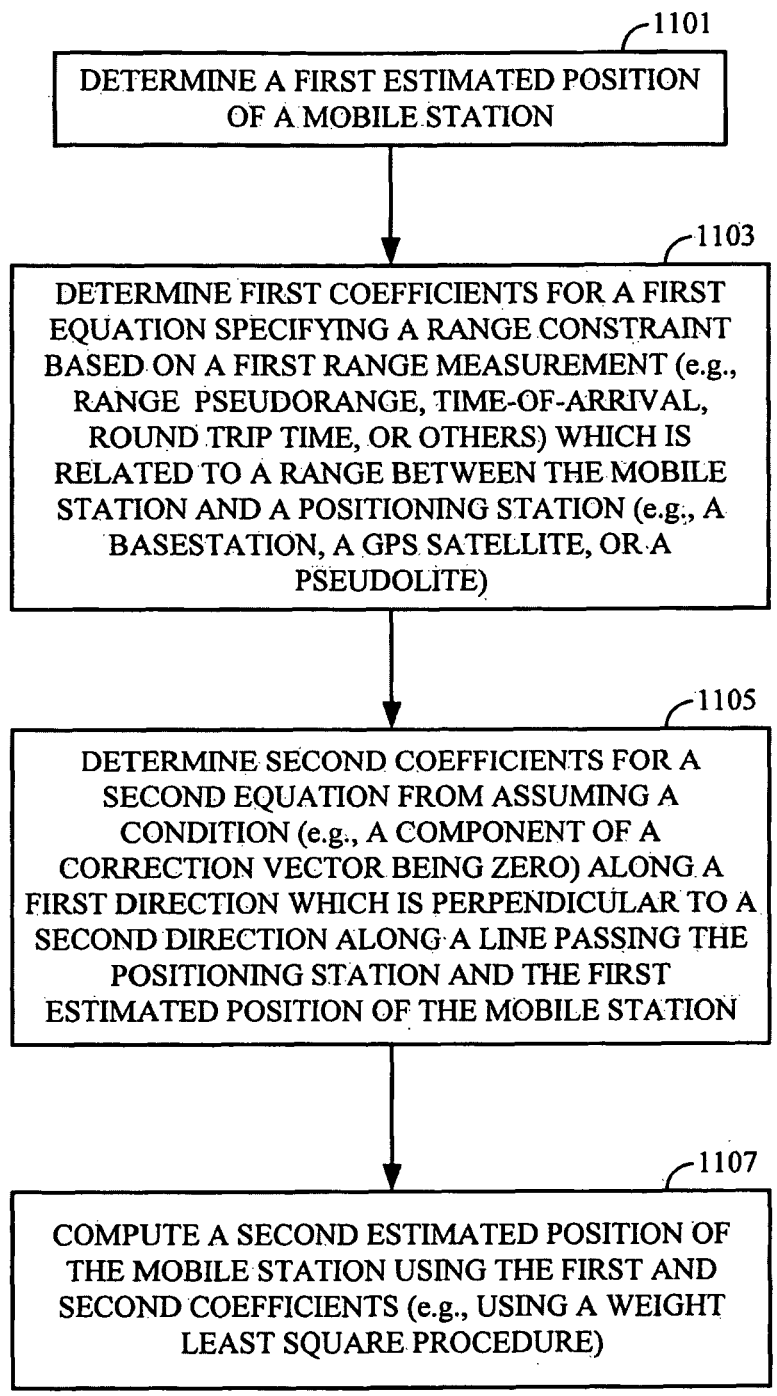
FIG. 11 shows a flow chart of a method to determine an estimated position of a mobile device according to one embodiment of the presently disclosed method and apparatus.

FIG. 11 shows a flow chart of a method to determine an estimated position of a mobile device according to one embodiment of the disclosed method and apparatus. Operation 1101 determines a first estimated position of a mobile device; and operation 1103 determines first coefficients for a first equation specifying a range constraint based on a first range measurement (e.g., range, pseudorange, arrival time, round trip time, or others) which is related to a range between the mobile device and a navigational transmitter. Operation 1105 determines second coefficients for a second equation from assuming a condition (e.g., a component of a correction vector being zero) along a first direction which is perpendicular to a second direction along a line passing the navigational transmitter and the first estimated position of the mobile device. Operation 1107 computes a second estimated position of the mobile device using the first and second coefficients (e.g., using a weight least square procedure). When a weighting procedure is used, the weight for a range constraint and it's associated orthogonal constraints can be determined from the distance between the mobile device and the basestation. For example, the closer the mobile device to the basestation, the more weight on the orthogonal constraints, and the less weight on the range constraint.

Figure 12:
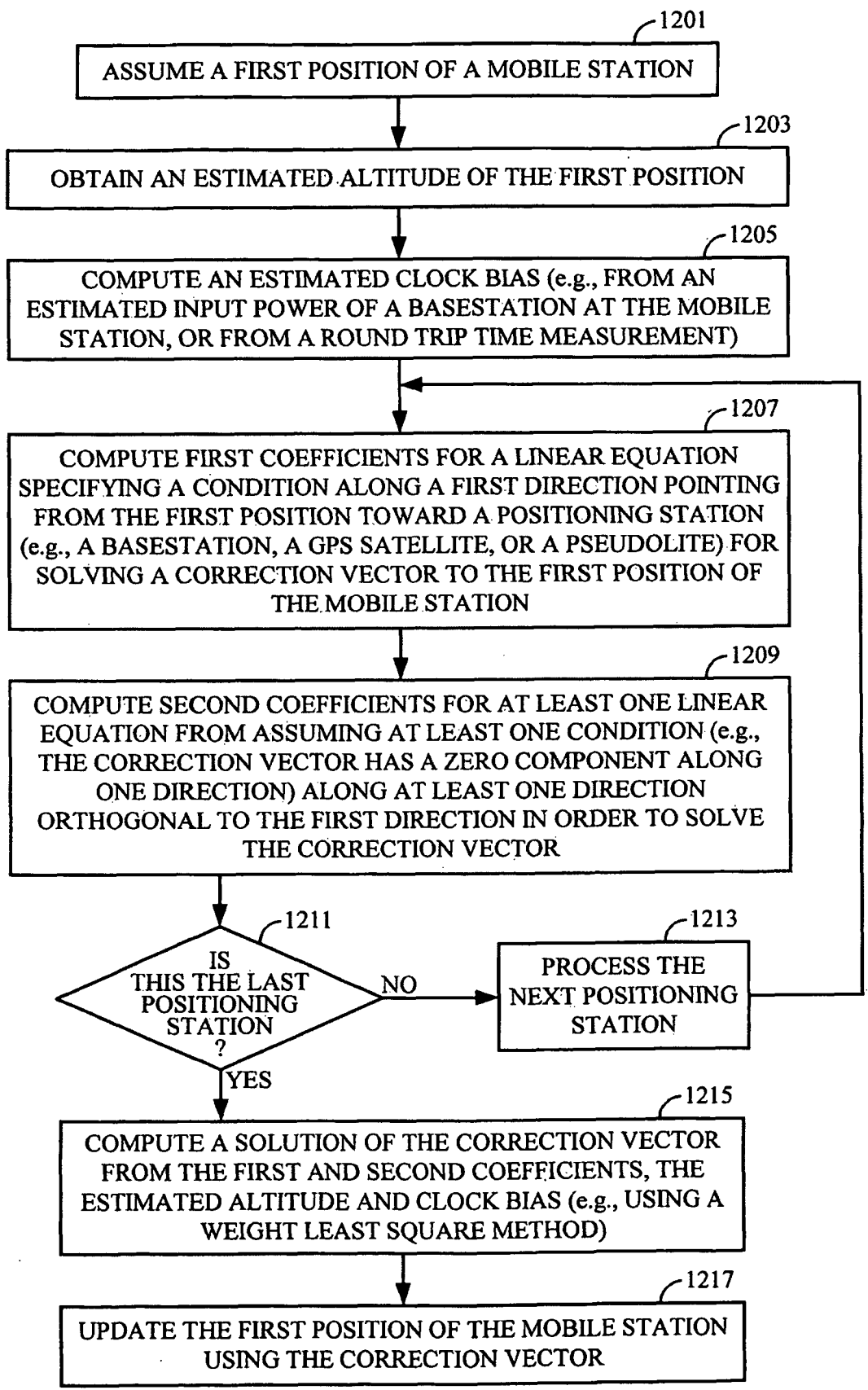
FIG. 12 shows a detailed flow chart of a method to determine an estimated position of a mobile device according to one embodiment of the presently disclosed method and apparatus.

FIG. 12 shows a detailed flow chart of a method to determine an estimated position of a mobile device according to one embodiment of the disclosed method and apparatus. Operation 1201 assumes a first position of a mobile device; and operation 1203 obtains an estimated altitude of the first position, using an altitude aiding based on the first assumed position. Operation 1205 computes an estimated clock bias (e.g., from an Estimated Input Power of a basestation at the mobile device, or from a round trip time measurement). Operations 1207-1209 are preformed for each of the navigational transmitters to determine range and orthogonal constraints for each of the navigational transmitters. Operation 1207 computes first coefficients for a linearized range constraint, which is a linear equation specifying a condition along a first direction pointing from the first position toward a navigational transmitter for solving a correction vector to the first position of the mobile device; and operation 1209 computes second coefficients for at least one orthogonal constraint, which is a linear equation from assuming at least a zero component of the correction vector along one direction orthogonal to the first direction. Once operation 1211 determines that all navigational transmitters are processed to establish linear equations for the unknowns, operation 1215 computes a solution of the correction vector from the first and second coefficients, the estimated altitude and clock bias (e.g., using a weight least square method). Operation 1217 updates the first position of the mobile device using the computed correction vector. While orthogonal constraints are illustrated as examples, other assumed conditions can also be used to constrain the iterative solutions.

Figure 13:
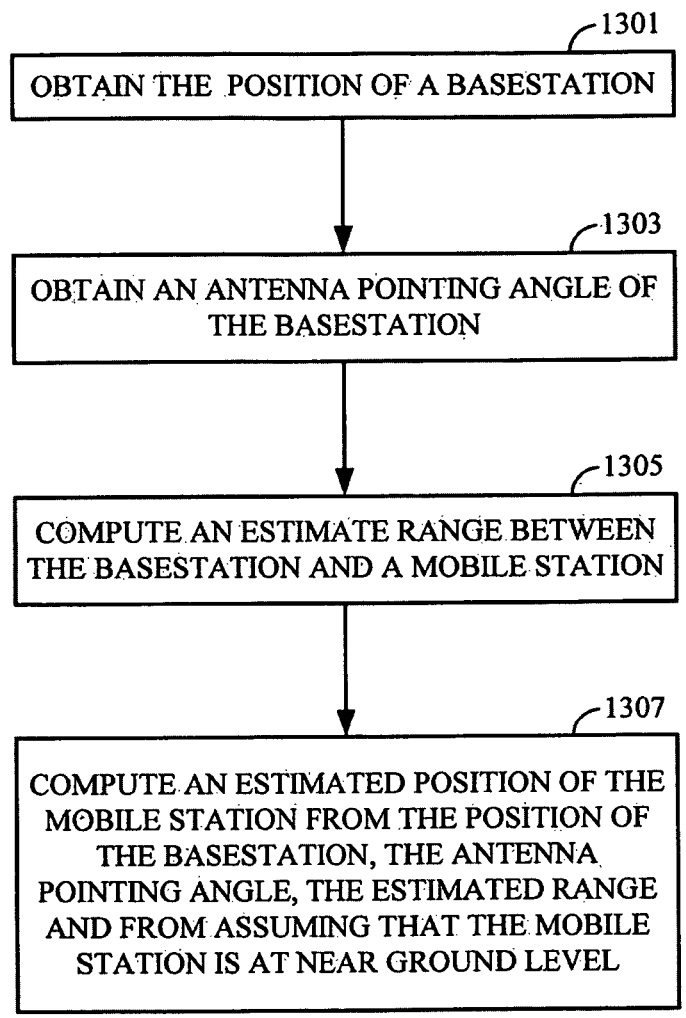
FIG. 13 shows a flow chart for another method to determine an estimated position of a mobile device according to one embodiment of the presently disclosed method and apparatus.

FIG. 13 shows a flow chart for another method to determine an estimated position of a mobile device according to one embodiment of the disclosed method and apparatus. Operation 1301 obtains the position of a basestation; and operation 1303 obtains an antenna pointing angle of the basestation. Operation 1305 computes an estimated range between the basestation and a mobile device. The estimated range can be obtained from a signal strength indicator (e.g., an Estimated Input Power), or from a round-trip-time measurement. Operation 1307 computes an estimated position of the mobile device from the position of the basestation, the antenna pointing angle, the estimated range and from assuming that the mobile device is at near ground level. Altitude aiding can be used to determine the altitude of the mobile device.

Figure 14:
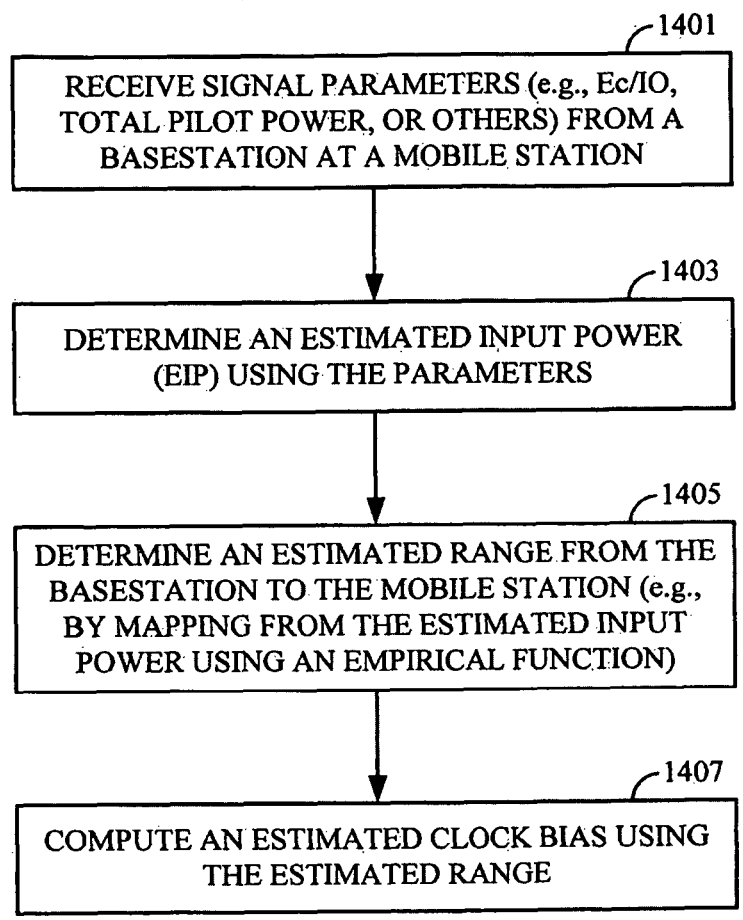
FIG. 14 shows a flow chart for a method to determine an estimated clock bias of a mobile device according to one embodiment of the presently disclosed method and apparatus.

FIG. 14 shows a flow chart for a method to determine an estimated clock bias of a mobile device according to one embodiment of the disclosed method and apparatus. Operation 1401 receives signal parameters (e.g., Ec/I0, total pilot power, or others) from a basestation at a mobile device. Operation 1403 determines an Estimated Input Power (EIP) using the parameters. Operation 1405 determines an estimated range from the basestation to the mobile device (e.g., by mapping from the Estimated Input Power using an empirical function). Operation 1407 computes an estimated clock bias using the estimated range.

For an example of the usefulness of these constraints, consider the case of having only one available pilot signal from a basestation. Thus, only one traditional linearized range constraint can be established. Since the altitude of the mobile device can be estimated by assuming the user is near ground level with altitude aiding, two more independent measurements are required to determine the position of the mobile device. The traditional linearized range constraint might be somewhat de-weighted if the estimate range between the mobile device and the basestation is relatively small, to account for directional uncertainty. Typically, the first a-priori position estimate would be along a line projecting from the basestation along its antenna pointing angle; and the range estimate associated with the primary measurement could be reduced based upon angular uncertainty by scaling with sinc (antenna opening/2). An estimated clock bias based upon information received in the IS-801 message (e.g., Estimated Input Power) can be used to establish the clock bias constraint. The clock bias constraint is referred to as "Coarse Time Aiding". Finally, an orthogonal constraint in the horizontal plane can be used to provide an additional equation for the unknowns. The orthogonal constraint in the horizontal plane results in one extra equation per basestation. Thus, a stable, albeit very coarse, four-dimensional navigation solution can be achieved with only one available pilot. In cases where the mobile device is very close to the basestation (often true in some closed cell situations), this is often good enough to provide a navigation solution with reasonable accuracy. Regardless of the distance to the tower, the coarse solution may be used to further refine the search windows for other available navigational transmitters. Finally, it should be noted that round trip time measurements would further improve the accuracy, essentially replacing coarse time aiding with a more accurate measurement of the clock bias, which would in turn improve the accuracy estimate of the orthogonal pilot, since its weight is primarily based upon the a-priori clock bias estimate.

Also it is possible to simply provide the center of the cell sector as a navigation solution in this single-pilot case, or perhaps to move the solution in and out based upon CTA estimates. However, the approach of establishing linear equations for orthogonal constraints and clock bias constraints not only works for the one-pilot case, but also can be applied generalized cases where additional measurements are available.

Consider a case where one pilot phase measurement for a basestation and one pseudorange measurement for a satellite are available. Terrain height is known from altitude aiding, providing essentially 3 traditional measurements. Since altitude aiding and coarse time aiding reduce the problem to the horizontal plane, there is generally a hyperbola of reasonable solutions to the location of the mobile device, where both the range constraints corresponding to the satellite and the basestation are satisfied. In this case, it is likely that an iterative least squares solution would be unstable. In this situation, a pilot orthogonal adds an additional constraint to the solution, keeping it from oscillating or diverging. Thus, the solution would reliably converge to a single point on the hyperbola, depending upon the initial a-priori estimate.

In the foregoing specification, the disclosed method and apparatus has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to determine a position of a mobile device in a positioning system, the method comprising:
  obtaining a first estimated position of the mobile device;
  determining an estimated clock bias from a strength indicator of a signal transmitted from a navigational transmitter to the mobile device;
  computing a correction vector for the first estimated position of the mobile device based on a linearized range constraint, an orthogonal range constraint, and the estimated clock bias; and
  determining a second estimated position of the mobile device using the correction vector;
  wherein the linearized range constraint comprises a first linear equation specifying a condition along a first direction from the first estimated position of the mobile device toward the navigational transmitter;
  wherein the orthogonal range constraint comprises a second linear equation with a zero component of the correction vector along a second direction orthogonal to the first direction.

2. The method as in claim 1 wherein the navigational transmitter comprises one of:

a) a basestation; or
b) a pseudolite.

3. The method as in claim 1 wherein the estimated clock bias is weighted against other constraints in determining the estimated position of the mobile device.

4. The method as in claim 1 wherein the strength indicator comprises an Estimated Input Power (EIP).

5. The method as in claim 4 wherein said determining the estimated clock bias comprises:
receiving parameters from the navigational transmitter; and
computing the Estimated Input Power (EIP) from the parameters.

6. The method as in claim 5 wherein the parameters comprise at least one of:
a) Ec/I0; or
b) total pilot power.

7. The method of claim 1, further comprising computing first coefficients for the linear equation specifying the condition along the first direction.

8. The method of claim 7, further comprising computing second coefficients for the linear equation along the second direction orthogonal to the first direction.

9. A non-transitory machine readable media containing executable computer program instructions which when executed by a digital processing system cause said system to perform a method to determine a position of a mobile device in a positioning system, the method comprising:
obtaining a first estimated position of the mobile device;
determining an estimated clock bias from a strength indicator of a signal transmitted from a navigational transmitter to the mobile device;
computing a correction vector for the first estimated position of the mobile device based on a linearized range constraint, an orthogonal range constraint, and the estimated clock bias; and
determining a second estimated position of the mobile device using the correction vector;
wherein the linearized range constraint comprises a first linear equation specifying a condition along a first direction from the first estimated position of the mobile device toward the navigational transmitter;
wherein the orthogonal range constraint comprises a second linear equation with a zero component of the correction vector along a second direction orthogonal to the first direction.

10. The media as in claim 9 wherein the navigational transmitter comprises one of:
a) a basestation; or
b) a pseudolite.

11. The media as in claim 9 wherein the estimated clock bias is weighted against other constraints in determining the estimated position of the mobile device.

12. The media as in claim 9 wherein the strength indicator comprises an Estimated Input Power (EIP).

13. The media as in claim 12 wherein said determining the estimated clock bias comprises:
receiving parameters from the navigational transmitter; and
computing the Estimated Input Power (EIP) from the parameters.

14. The media as in claim 13 wherein the parameters comprise at least one of:
a) Ec/I0; or
b) total pilot power.

15. A digital processing system to determine the position of a mobile device in a positioning system, the processing system comprising:
means for obtaining a first estimated position of the mobile device;
means for determining an estimated clock bias from a strength indicator of a signal transmitted from a navigational transmitter to the mobile device;
means for computing a correction vector for the first estimated position of the mobile device based on a linearized range constraint, an orthogonal range constraint, and the estimated clock bias; and
means for determining a second estimated position of the mobile device using the correction vector;
wherein the linearized range constraint comprises a first linear equation specifying a condition along a first direction from the first estimated position of the mobile device toward the navigational transmitter;
wherein the orthogonal range constraint comprises a second linear equation with a zero component of the correction vector along a second direction orthogonal to the first direction.

16. The digital processing system as in claim 15 wherein the navigational transmitter comprises one of:
a) a basestation; or
b) a pseudolite.

17. The digital processing system as in claim 15 wherein the estimated clock bias is weighted against other constraints in determining the estimated position of the mobile device.

18. The digital processing system as in claim 15 wherein the strength indicator comprises an Estimated Input Power (EIP).

19. The digital processing system as in claim 18 wherein said means for determining the estimated clock bias comprises:
means for receiving parameters from the navigational transmitter; and
means for computing the Estimated Input Power (EIP) from the parameters.

20. The digital processing system as in claim 19 wherein the parameters comprise at least one of:
a) Ec/I0; or
b) total pilot power.

21. A digital processing system to determine the position of a mobile device in a positioning system, the processing system comprising:
a processor configured to:
obtain a first estimated position of the mobile device;
determine an estimated clock bias from a strength indicator of a signal transmitted from a navigational transmitter to the mobile device;
compute a correction vector for the first estimated position of the mobile device based on a linearized range constraint, an orthogonal range constraint, and the estimated clock bias; and
determine a second estimated position of the mobile device using the correction vector;
wherein the linearized range constraint comprises a first linear equation specifying a condition along a first direction from the first estimated position of the mobile device toward the navigational transmitter;
wherein the orthogonal range constraint comprises a second linear equation with a zero component of the correction vector along a second direction orthogonal to the first direction.

22. The system as in claim 21 wherein the navigational transmitter comprises one of:

a) a basestation; or
b) a pseudolite.

23. The system as in claim 21 wherein the processor is configured to weight the estimated clock bias against other constraints in determining the estimated position of the mobile device.

24. The system as in claim 21 wherein the strength indicator comprises an Estimated Input Power (EIP).

25. The system as in claim 24 wherein when determining the estimated clock bias the processor is further configured to:
  receive parameters from the navigational transmitter; and
  compute the Estimated Input Power (EIP) from the parameters.

26. The system as in claim 25 wherein the parameters comprise at least one of:
  a) Ec/I0; or
  b) total pilot power.

* * * * *